United States Patent Office 3,440,509
Patented Apr. 22, 1969

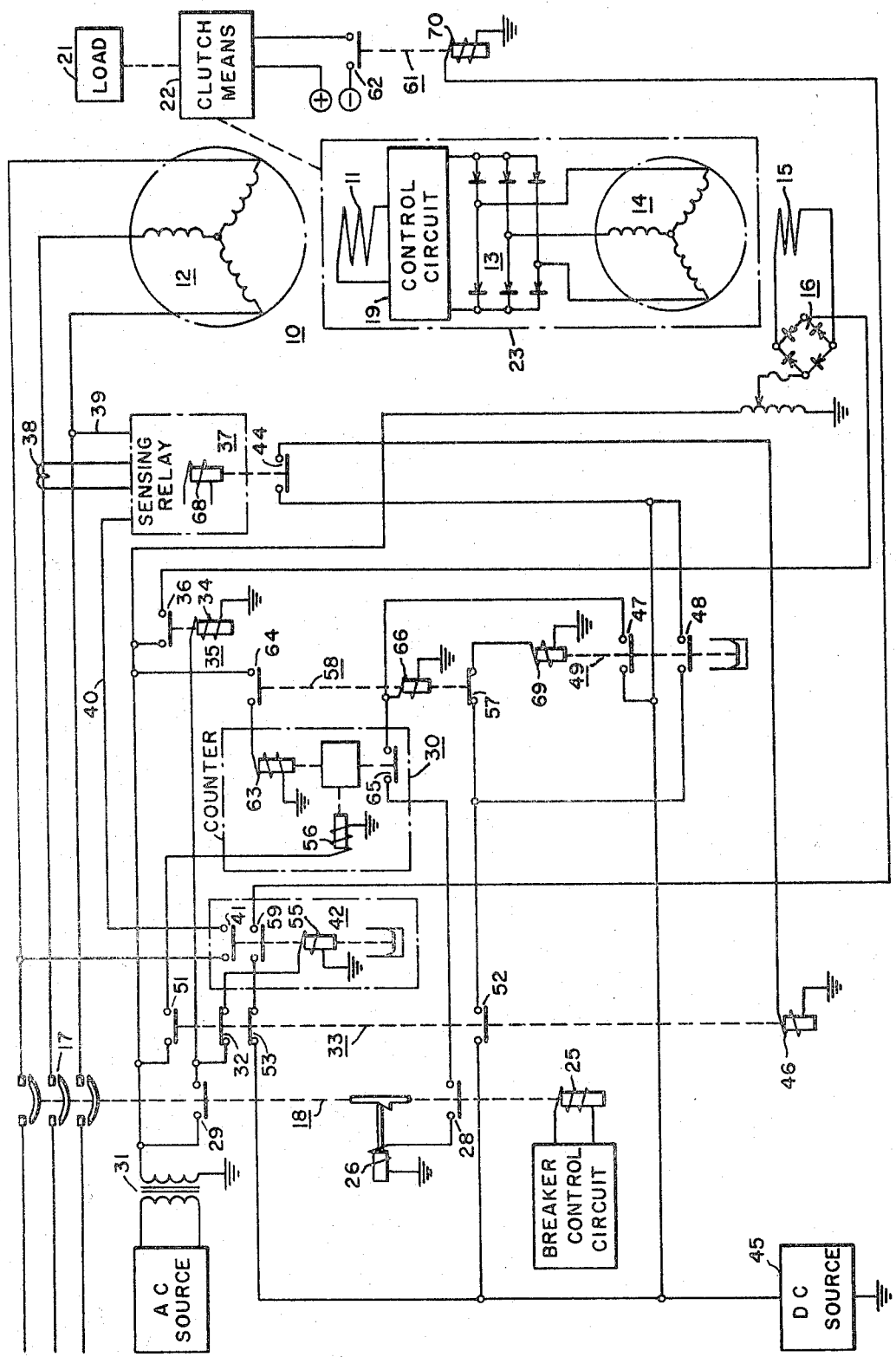

3,440,509
RESYNCHRONIZING MEANS FOR BRUSHLESS SYNCHRONOUS MOTORS
Anthony Tomeo, Pittsburgh, John Allison Nelson, Wilmerding, and Arthur H. Hoffmann, Monroeville, Pa., assignors to Westinghouse Electric Corporation, Pittsburgh, Pa., a corporation of Pennsylvania
Filed Nov. 21, 1966, Ser. No. 595,726
Int. Cl. H02p 3/18; H02h 7/08
U.S. Cl. 318—167                          7 Claims The present invention relates to brushless synchronous motor control means and particularly to a unique control circuit arrangement for automatically attempting resynchronization of a motor after it pulls out of synchronism, and after a predetermined number of unsuccessful attempts at resynchronization automatically turns the motor off.

Ordinarily, pullout of a synchronous motor may occur because of motor overload, low stator voltage of sufficient duration or loss of the motor field. The loss of the motor field in a brushless motor can occur because of loss of the exciter field, grounding of the motor field or failure of the rotating diodes. If motor overload or low stator voltage is the cause of the pullout, the pullout condition is usually only temporary so that a pullout sensing relay can be used to unload the motor and allow it to be resynchronized. Pullout by exciter field loss can be detected by the usual field loss relay which is easily connected to the stationary field winding. However, motor field grounding or rotating diode failure, in a brushless motor, is not easily detected since the motor, diode and control circuitry therefor are mounted on a rotating shaft without fixed means, such as brushes, to which sensing relays may be connected. Therefore, if the motor pulls out of step due to say diode failure, simply unloading the motor will not correct the condition causing the pullout. When the load is restored, the motor will again pullout of step.

Thus, a pullout relay by itself cannot distinguish between the above named condition (temporary and permanent) that can cause the pullout. What is needed, and what forms the primary object of the present invention, is an out-of-step sensing arrangement in which a pullout relay first operates an unloading device to attempt resynchronization of a motor for the conditions that generally cause only temporary pullout, and secondly, operates a device to trip the motor off the power line if resynchronization is not accomplished, which would be the case with the loss of the motor field that cannot be rectified by simply unloading the motor.

Another object of the invention is to provide a novel control arrangement for brushless synchronous motors in which resynchronization is accomplished or removal of the motor from the line is insured, through operation of reliable means in an efficient and effective manner.

Briefly, these and other objects of the invention are accomplished with the use of a relay connected to sense a predetermined lagging power factor in the motor which is indicative of the out of synchronization state of the motor. If the motor pulls out of step, the power factor sensing relay operates to simultaneously unload the motor, energize a counter device which advances (counts) one position toward zero, energizes one timing relay and deenergizes a second timing relay which operates to deenergize the power factor sensing relay. With the sensing relay deenergized, the synchronized motor is again loaded and the sensing relay is returned to the motor circuit by operation of the second timing relay. The sensing relay is now ready to again detect an out-of-step condition of the synchronous motor. These steps are then repeated for as many times as the counter device is set. If the motor has not resynchronized after the set number of attempts, a set of counter contacts close to prepare a main breaker trip circuit for operation. The one (first) timing relay remains energized during the attempts at synchronization and finally times out and completes the circuit containing the counter contacts, thereby energizing a breaker trip coil that opens the main lines to the motor.

In summary, the unique control arrangement of the present invention provides several attempts at resynchronizing a brushless synchronous motor that has pulled out of step, and if the motor fails to synchronize after the several attempts, the arrangement functions to shut the motor down.

The nature of the arrangement with its objects and operation will become more apparent from the following detailed description, taken in connection with the accompanying drawing in which:

The sole figure shows a schematic diagram of a circuit arrangement connected in accordance with the principles of the invention.

Specifically, the invention, as shown in the figure, includes a three phase brushless synchronous motor 10 of the type shown and described in copending application Ser. No. 368,484 filed May 19, 1964 by Frank V. Frola and assigned to the present assignee. The figure further shows the novel circuit arrangement, briefly described above, in which the motor is connected to be operated and controlled thereby. The motor 10 includes a rotating field winding 11 and stationary (stator) windings 12, the stationary windings connected to be energized by three phase alternating current supplied through main contacts 17 of a circuit breaker 18. The field winding 11 is energized by direct current provided by rotating diodes 13 which rectify an alternating current produced by an exciter armature 14 disposed to rotate within a stationary, direct current exciter field winding 15. The direct current for the exciter field may be supplied from any suitable external source which, in the figure, is shown provided by a rectifier bridge 16 connected to rectify the alternating current output from a source 20 and a transformer 31.

The direct current provided by the rotating diodes 13 is applied to the motor field winding 11 by a control circuit generally designated 19. The control circuit includes static circuit modules (not shown) which apply the direct current to the motor field at the proper time and angle to effect synchronous running speed of the motor. The control circuit further functions to remove a starting resistor (not shown) from the motor field when the motor attains synchronous speed.

The exciter armature 14, the diodes 13, the control circuit 19 and the motor field winding 11 are disposed on a rotating shaft diagrammatically depicted in the figure by dashed outline 23.

In the figure, the circuit arrangement is shown deenergized with the relays in deenergized positions.

The motor 10 may be further mechanically coupled to a load 21 through a clutch means 22, the load and clutch means being representatively shown.

The circuit breaker 18 includes a closing coil 25 which may be controlled manually or automatically, and a trip coil 26 controlled as described hereinafter, and which may be also controlled manually or by any additional automatic means as desired.

The circuit breaker 18 has further two auxiliary and normally open contacts 28 and 29, the contacts 28 being connected between trip coil 26 and a counting device generally designated 30. The contacts 29 are connected between the transformer 31 and contacts 32 forming part of an auxiliary relay device 33, and between the transformer and an energizing coil 34 of relay device 35, having contacts 36 which are operative to control application of the voltage from the transformer to the exciter field winding 15.

The auxiliary relay device 33 is so named because of its auxiliary or secondary operation in response to the operation of another (primary) relay device, namely, a sensing relay 37 connected to sense the synchronization state of the motor 10. The sensing relay 37 may take the form of a power factor sensing device designed to detect a lagging power factor of the motor due to the motor pulling out of its synchronous speed of rotation though the invention is not limited thereto. Other sensing devices may be employed to determine the state of motor synchronization and to operate a relay to start a sequence of operation which allows the motor 10 to attempt resynchronization.

In the figure, the sensing relay 37 is connected to the power lines by a current transformer 38 inductively coupled to one line, and by two potential leads 39 and 40 connected to the other two lines. The lead 40, however, is connected to the line through contacts 41 of a time delay relay 42. The sensing relay 37 includes a set of contacts 44 connected between a source of direct current 45 (lower lefthand corner) and an energizing coil 46 forming part of the auxiliary relay 33. The contacts 44 are futrher connected to two sets of contacts 47 and 48 of a second timing relay 49.

The auxiliary relay 33 has four sets of contacts shown in vertical alignment in the drawing with the top and bottom contacts 51 and 52, respectively, in open position while the two center contacts 32 (previously mentioned) and 53 are shown closed. The previously mentioned contacts 32 are connected to control of the application of voltage from the source 20 and transformer 31 to a closing coil 55 of the time delay relay 42. The top (uppermost) contacts 51 are connected to control the application of the transformer voltage to an energizing coil 56 of the counting device 30. The bottom (lowermost) contact 52 is connected to control the application of DC voltage from the source 45 to the contacts 48 of the second timing relay 49 and to a set of (lower) contacts 57 forming part of another relay device 58. The contacts 53 are connected to control the application of DC voltage to a second set of contacts 59 in the time delay relay device 42, which, in turn are connected to control the application of the DC voltage to a clutch control relay 61 connected to control the operation of the clutch means 22 through its set of contacts 62.

The counting device 30 is employed to count the number of times the circuit arrangement operates to unload the motor 10 in its successive attempts at resynchronization, and after a predetermined number of such attempts operates to cause removal of the power applied to the motor. The counting device is further operative to reset the count to its original setting when the motor attains synchronization and when the motor is turned off. In the drawing this latter feature is diagrammatically represented by a reset coil or solenoid 63 connected between ground and a set of (upper) contacts 64 associated with the relay 58. The counting mechanism is schematically represented by the coil 56. The counting device 30 further includes a set of contacts 65 connected between the contacts 28 of the circuit breaker 18 and an actuating coil 66 for the relay 58.

As mentioned above, the figure shows the circuit arrangement deenergized with the motor 10 turned off and all relays deenergized.

In operation, the motor 10 is energized and the rotating section 23 started to rotate by energizing the coil 25 of the main circuit breaker 18 which closes main contacts 17 and the auxiliary contacts 28 and 29. The main contacts 17 apply the three phase alternating current to the stator winding 12 while auxiliary contact 29 applies the AC voltage from transformer 31 to the actuating coil 34 of the relay 35 thereby closing the contacts 36 which in turn apply power to the exciter field winding 15 through the rectifying bridge 16.

As mentioned earlier, and as explained in the above cited copending application, the rotating section 23 includes the exciter armature winding 14 which rotates in the exciter field of winding 15 and thus develops an alternating current voltage which is rectified and applied to the motor field winding 11 at the proper time by the static control means 19 to effect synchronization of the motor 10. The closing of the auxiliary contacts 29 further operates to apply the AC power from the source 20 and the transformer 31 to the coil 55 through the closed contacts 32 of the auxiliary relay 33. The coil 55, forming part of the time delay relay device 42, is energized by the application of the AC power and thus functions to close the contacts 41 and 59 mechanically associated therewith after two predetermined periods of time. That is, the contacts 59 are set to close a short period of time after the motor 10 starts to run, the period of time being sufficient to allow synchronization of the motor. The brushless motor field control circuit 19 causes direct current from the rectifier bridge 13 to be delivered to the motor field 15 to cause the motor to be synchronized. When the contacts 59 close, the DC voltage from the source 45 is applied through the contacts to a coil 70 of the clutch control relay 61 which is thereby energized to place the load 21 on the motor. After the load is applied to the motor, the contacts 41 time out and close which connects the sensing relay 37 to the stator circuit of the motor by completing the circuit between the upper phase line and the lead 40.

When and if the motor 10 pulls out of step, a coil 68, forming a part of the sensing relay 37, is connected to be energized by a signal representing a lagging power factor in the motor. With the energization of the coil 68, the contacts 44 close which then energize the coil 46 of the auxiliary relay 33 by applying a DC potential thereto from the source 45. When this occurs, coil 46 closes the contacts 51 and 52, and opens the contacts 32 and 53. The following events are thereby caused to occur.

First, by opening contacts 53 (normally closed), the energizing current to the clutch control relay coil 70 is cut off thereby opening the contacts 62 of the clutch control relay 61 which causes the removal of the load 21 from the motor 10 by the resulting operation of the clutch 22. By removing the load from the motor, the motor is given opportunity to attain synchronous running speed while simultaneously removing a possible overload condition that could be the cause of the pull out.

Secondly, the actuation of the relay 33 deenergizes the time delay relay 42 by the opening of contacts 32 which removes the AC energizing potential to the relay actuating coil 55. The time delay relay 42 is of the type that resets itself upon being deenergized. Its contacts 41 and 59, of course, open when the energizing potential is removed from the coil 55 by the opening of the contacts 32.

Thirdly, the energization of the relay coil 46 (of relay 33) causes the energization of the second timing relay 49 by the closing of contacts 52 which are normally open. The closed contacts 52 provide a current path from the DC source 45 to ground through the closed contacts 57 of relay 58 and an actuating coil 69 forming part of the second timing relay 49. The relay 49 immediately seals itself in the circuit by closing the contacts 48 which are instantly operated so that with the opening of the contacts 52, relay 49 (previously energized thereby) will not be deenergized for reasons to be explained hereinafter. The contacts 47 of the relay 49 are time delay contacts that close at a later time in a manner to be explained hereinafter.

Fourthly, the energization of auxiliary relay coil 46 causes the actuation of the counter device 30 by the closing of the contacts 51 (normally open) which in turn apply an AC potential to the actuating coil 56. When energized, counter 30 makes one count towards zero at which time its contacts 65 close. Until the zero position is reached, however, contacts 65 remain open as shown.

As mentioned earlier, the time delay relay 42 was deenergized and reset by the opening of the contacts 32 when an out of step condition in motor 10 was sensed by the sensing relay 37. However, with the deenergization of relay 42, the sensing relay 37 is removed from the motor circuit by the opening of the contacts 41. With the sensing relay out of the motor supply circuit, the sensing relay coil 68 is deenergized thereby opening the contacts 44 which in turn deenergizes the auxiliary relay 33. This allows the time delay relay 42 to resume its timing function because contacts 32 of the auxiliary relay reclose thereby applying power to the actuating coil 55 of the time delay relay.

During the time relay 42 was deenergized and load 21 removed from motor 10, resynchronization of the motor could have been accomplished if the load was overloading it or if a temporary low stator voltage was the cause of the desynchronization. With the energization of the relay 42, its first and short delay time contacts 59 delay in closing for a period of time sufficient to allow synchronization of the motor 10 as mentioned earlier. When the contacts 59 close, the load 21 is again placed on the motor through operation of clutch 22 which is again controlled by the actuation of the clutch control relay 61 receiving its actuating current through the contacts 59. A short time thereafter, the second and longer time delay contacts 41 of the relay 42 close, once again placing the sensing relay 37 in the motor circuit. The relay 37 is again now ready to sense the power factor in the phase lines supplying the motor 10. If the motor is running in step, no signal is produced (as explained above) to actuate the sensing relay. With the continued in-step running of motor 10, the second timing relay 49 times out and closes the time delay contacts 47 which energize the relay 58 by applying the DC potential to its actuating coil 66. With the energization of relay 58, contacts 57 thereof are opened, thereby deenergizing the timing relay 49 which receives its energizing current through the contacts 57 and the contacts 52 (normally open with motor 10 in synchronization and the sensing relay contacts 44 open). With the deenergization of the timing relay 49, its contacts 48 (which instantly close with the energization of relay 49) are opened thereby removing the above explained seal-in circuit across contacts 52. The relay 58, energized, further closes its second (upper) set of contacts 64 which actuates counter reset solenoid 63 by applying the AC potential thereto from the transformer 31. The reset solenoid operates to reset counter 30 to its original setting. Thus, if the motor 10 remains running in step for the period of time set by time delay contact 47 of the timing relay 49, the counter 30 is automatically reset so that the original number of attempts at synchronization of motor 10 is again made possible.

With the deenergization of the timing relay 49, the time delay contacts 47 open thereby deenergizing the relay 58 by removing its energizing (DC) potential. With the deenergization of the relay 58, its contacts 57 reclose without effect on the timing relay 49 since its contacts 48 and those (52) of the auxiliary relay 33 are presently open. The contacts 64 of the relay 58 open with its deenergization so that the energizing (AC) potential to the counter reset solenoid 63 is removed. Thus, after resetting counter 30, the reset solenoid is removed from the circuit by opening the contacts 64.

The above recited functions occur with motor 10 regaining its synchronization. If, however, the motor has not regained its synchronization, the sensing relay 37 will again be actuated resulting in a repetition of the relay operations described above in which the motor 10 is unloaded and loaded with the counter 30 counting each time this occurs. The number of attempts at synchronization (unloading and loading of motor 10) is determined by the setting of counter 30 as mentioned earlier. After the predetermined number of attempts at resynchronization have occurred without success, the counter reaches its zero position at which time its contacts 65 are made to close.

The closing of contacts 65 sets up a breaker trip circuit including the trip solenoid 26 connected to the presently closed (shown open) contacts 28 of the main circuit breaker 18. The second timing relay 49 (which is energized through operation of relays 33 and 37) and its time delay contacts 47 are set so that contacts 47 close after the period of time utilized by counter 30 in completing its count to zero which is, of course, the time used in the total number of attempts at resynchronizing the motor, the number of such attempts being the number preset on the counter. Thus, the second timing relay times out and closes contacts 47 after the counter 30 reaches zero position which causes the closing of the contacts 65. With the closing of the contacts 65 and 47 (and 28) a current path is completed through trip coil 26 from the DC source 45 to ground. The trip coil is energized and functions to release the main circuit breaker 18 from its closed position thereby opening the main breaker contacts 17 and auxiliary contacts 28 and 29. The motor 10 is thereby turned off and the field is removed by the deenergization of the relay 35.

Simultaneously with the actuation of the trip circuit a circuit is completed through the relay 58 and ground for the flow of current from the DC source 45, since the time delay contacts 47 remain closed until the relay 49 is deenergized. As explained above, with the case of motor 10 pulling in and staying in step, relay 58 closes contacts 64 and opens contacts 57 so that the counter 30 is reset to its original position by operation of the reset solenoid 63, and the relay 49 is deenergized by opening its current flow path from the DC source 45. With the relay 49 deenergized, its contacts 47 and 48 open (as shown) which in turn deenergizes the relay 58 which again closes its contacts 57 and opens its contacts 64 as shown.

The remainder of the control circuit returns to its normal off position with the deenergizing of motor 10 and consequently the sensing relay 37.

The above described means with their prescribed functions provide a unique means for attempting resynchronization of a brushless synchronous motor, and an eventual deenergization of the motor should all attempts fail. The number of attempts can be simply and easily set by using the counter device as described. The components employed to obtain the new and unobvious results (resynchronization of motor 10 for temporary pullout conditions and tripping the main circuit breaker 18 when the motor field is lost) are reliable, proven devices so that the overall circuit and structure as explained above provides a reliable, effective and efficient motor resynchronization means that has heretofore been unavailable in the prior art.

Though the invention has been described with a certain degree of particularity, it is to be understood that the disclosure has been made by way of example only and that changes may be made therein without departing from the scope and spirit of the invention. For example, the AC source 20 together with transformer 31 can be eliminated and a DC source employed in their place. This would also eliminate the necessity for diodes 16. Similarly the DC source 45 could be an AC source instead.

What is claimed is:

1. A synchronous motor control arrangement for attempting resynchronization of the motor after pullout, and for turning the motor off after a predetermined number of attempts at resynchronization, the arrangement comprising means for controlling the energization of the motor,
    time delay means connected to be energized upon energization of the motor,
    the time delay means being adapted to apply a load to the motor after the motor has started to run and after a period of time sufficient to allow synchronization of the motor, means for sensing the synchronous condition of the motor, relay means for deenergizing the time delay means to effect removal of the load when the sensing means senses an out-of-step condition in the motor, a counting device, the relay means being further adapted to actuate the counting device, and thereafter to cause reenergization of the time delay means, the time delay means being again effective to reload the motor after the period of time sufficient to allow synchronization of the motor, the counting device being effective to count the number of times the load is removed from the motor, and to cause actuation of the control means to deenergize the motor when the counting device counts a preset number of times.

2. The motor control arrangement of claim 1 in which the time delay means is further adapted to connect the sensing means to the motor after the load has been applied to the motor, and to disconnect the sensing means from the motor when the load is removed from the motor.

3. The motor control arrangement of claim 1 including a second time delay means, the relay means being effective to energize the second time delay means when the sensing means senses the out-of-step condition in the motor, the second time delay means being effective to reset the counting device to its original setting after the lapse of time required for the counter device to count the preset number of times.

4. The motor control arrangement of claim 1 including a second time delay means, the relay means being effective to energize the second time delay means when the sensing means senses the out-of-step condition of the motor, the second time delay means being further effective to provide a trip circuit in combination with the counting device to effect the actuation of the control means.

5. The motor control arrangement of claim 1 in which the sensing means comprises a sensing relay connected to sense the power factor of the motor as an indication of motor synchronization.

6. The motor control arrangement of claim 1 in which the time delay means comprises a timing relay device having one set of contacts operative to apply the load to the motor after the motor has started to run and after a period of time sufficient to allow synchronization of the motor, and another set of contacts operative to connect the sensing means to the motor after the load has been applied and after the period of time sufficient to allow synchronization of the motor.

7. The motor control arrangement of claim 1 in which the means for energizing the motor includes a circuit breaker device provided with a trip coil connected to be actuated by the closing of a set of contacts actuated by the counting device counting the preset number of times, and the actuation of a second time delay device having a set of contacts adapted to close after the lapse of time required for the counting device to count the preset number of times.

References Cited

UNITED STATES PATENTS

| | | | |
|---|---|---|---|
| 2,285,917 | 6/1942 | Ewing | 318—170 XR |
| 2,424,227 | 7/1947 | Eigenberger | 318—170 XR |
| 2,709,235 | 5/1955 | Baude | 318—170 XR |
| 2,876,405 | 3/1959 | Diederich | 318—170 |

ORIS L. RADER, *Primary Examiner.*

GENE RUBINSON, *Assistant Examiner.*

U.S. Cl. X.R.

318—170